US007272795B2

(12) United States Patent
Garding et al.

(10) Patent No.: US 7,272,795 B2
(45) Date of Patent: Sep. 18, 2007

(54) MICRO-MONITOR TO MONITOR DATABASE ENVIRONMENTS

(75) Inventors: Phillip D. Garding, North Bend, WA (US); Russell Songco, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 810 days.

(21) Appl. No.: 10/608,481

(22) Filed: Jun. 27, 2003

(65) Prior Publication Data

US 2004/0267826 A1 Dec. 30, 2004

(51) Int. Cl.
*G06F 3/00* (2006.01)
(52) U.S. Cl. ...................................... 715/736
(58) Field of Classification Search ............ 715/736
See application file for complete search history.

(56) References Cited

U.S. PATENT DOCUMENTS

| 5,838,321 | A | 11/1998 | Wolf |
| 6,262,724 | B1 * | 7/2001 | Crow et al. ............... 715/723 |
| 6,564,174 | B1 * | 5/2003 | Ding et al. ............... 702/186 |
| 6,772,411 | B2 * | 8/2004 | Hayes et al. ............. 717/127 |
| 2001/0012022 | A1 * | 8/2001 | Smith ..................... 345/768 |
| 2001/0034732 | A1 | 10/2001 | Vorholt et al. |

FOREIGN PATENT DOCUMENTS

EP 0 660 219 A2 6/1995

OTHER PUBLICATIONS

Risch, R., "Monitoring Database Objects", *Proceedings of the 15th International Conference on Very Large Data Bases*, 1989, 445-453.

* cited by examiner

*Primary Examiner*—Kristine Kincaid
*Assistant Examiner*—Lê Nguyen
(74) *Attorney, Agent, or Firm*—Woodcock Washburn LLP (57) ABSTRACT

A micro-monitor for use in the monitoring of database environments is provided. In an illustrative implementation, a micro-monitor comprises a graphical user interface (GUI) having controls for navigation of information, controls to control database environments, a display area for displaying monitoring information about the database environments, and controls to maximize the display area to the size of conventional applications. When executed in a computing environment having an operating display space, the micro-monitor occupies a fraction of the operating display space which is occupied by other executing computing applications. In operation, the micro-monitor, accepts configuration variables for use to set monitoring thresholds, alarms, and display layout. Based on the configuration information, the micro-monitor will cooperate with the database environments which it is monitoring to obtain operational information for processing. The operational information is processed according to the configuration to generate desired monitoring information for display in the micro-monitor display area.

11 Claims, 7 Drawing Sheets

MICRO-MONITOR TO MONITOR DATABASE ENVIRONMENTS

FIELD OF THE INVENTION

The invention generally relates to monitoring applications to monitor computing environments, and, more particularly, to a micro-monitor for use to monitor database environments that provide rich, robust, and customizable data.

BACKGROUND OF THE INVENTION

As computing and communications technologies have advanced, there has been and continues to be a globalization of market places and the expansion of business and governmental enterprises alike. The geographic limitations of sharing data and information across large spans are becoming a distant memory. Moreover, with these technological advances, computing applications which were once slated for use on stand alone machines are being deployed across, what are often, large computing environment networks and platforms. As more data and computing applications become shared, there arises a need to monitor and control the systems that house data to ensure that they are properly functioning and protect against unwanted down time which could translate into lost revenues.

An enterprise's computing environment might contain hundreds of server computers and, possibly, thousands of client computers, all in communication to share applications and application data. Such computing environment might also support vast data stores for use to store application data. Today's data stores, or databases, are designed to operate on a single stand alone machine or among several computing machines (e.g. computer database servers) and cooperate with the computing environment to accept data for storage and/or to provide data to a requesting application. Given the importance of an enterprise's data, significant efforts have and are being made to ensure that the database management applications operating to store, manage, and retrieve the data are fully operational and fully optimal. In this context, database management application providers have developed monitoring applications which are in constant communication with the database management applications so that application errors may be monitored and resolved.

A database monitoring application may be an independent application cooperating with the enterprise's computing environment or could be a component of the database management application which is utilized to monitor the various databases across the computing environment. In either case, the monitoring application operates to poll the database and associated applications for relevant operations, optimization, and communication information which may be processed by the monitoring application for display to computing environment administrators. Generally, the monitoring applications are full blown computing applications which when executed may provide a graphical user interface having various display areas to display various information about the database management applications. In addition, the graphical user interface may have navigation controls to assist in the manipulation of the displayed data.

In practice, a database administrator launches the monitoring application (and associated graphical user interface). The monitoring application engages in communications with the database management applications and databases (e.g. data stores) it is to monitor. Using messaging services, the monitoring application requests specific data from the database management applications and databases (e.g. data stores) about the operational condition and state of the database management application and/or data store. This information may include communication integrity, transaction log information, processing integrity and efficiency. Processing the retrieved information, the monitoring application, using some predefined user defined configuration variables (e.g. flag indicators and warning condition thresholds), generates monitoring information for display on the monitoring application's graphical user interface display area.

Often the graphical user interface of the monitoring application takes up the same display space as any other computing application operating on the administrators computer, such as a word processing computing application, a spreadsheet, or e-mail computing application. As such, the monitoring application is cumbersome to operate the administrator must constantly switch back between the monitoring application and other computing applications (e.g. word processor, e-mail application, etc.) to keep on top of monitoring application reports and alerts. Moreover, administrators cannot dispose of the monitoring application as it provides crucial performance and operations data required to maintain the integrity of the database management applications being monitored.

From the foregoing it is appreciated that there exists a need of systems and methods that overcome the prior art.

SUMMARY OF THE EMBODIMENTS OF THE INVENTION

A micro-monitor for use in the monitoring of database environments is provided. In an illustrative implementation, a micro-monitor comprises a graphical user interface (GUI) having controls for navigation of information, controls to control database environments, and a display area for displaying monitoring information about the database information. The micro-monitor also comprises controls to maximize the display area of the micro-monitor as if it were a regular computing application. When executed in computing environment having an operating display space, the micro-monitor occupies a fraction of the operating display space which is occupied by other executing computing applications. In operation, the micro-monitor, through the GUI, accepts configuration variables for use to set monitoring thresholds, alarms, and display layout. Based on the configuration information, the micro-monitor will cooperate with the database environments which it is monitoring to obtain operational information for processing. The operational information is processed according to the configuration to generate desired monitoring information for display in the micro-monitor display area.

In an alternative contemplated implementation, the micro-monitor comprises a smaller form-factor of a conventional monitoring computing application. The smaller form-factor resulting in the micro-monitor, when executed in a computing environment having an operating display area, occupies less space than other executing computing applications operating on the computing environment. The micro-monitor, in this context, comprises controls to navigate through monitoring information, as well as, controls for controlling operations on the database environment.

Other features are described in more detail below.

BRIEF DESCRIPTION OF THE DRAWINGS

The herein described systems and methods are further described with reference to the accompanying drawings in which.

DETAILED DESCRIPTION OF ILLUSTRATIVE EMBODIMENTS

Overview:

A technique is provided wherein monitoring software is divided between a monitored server and a monitoring user computer, with the server portion of the software configured to reply, to a query from the monitoring user computer, with a compilation of information about the server and software services running on the server. Queries are sent periodically and are separated by a predefined time interval. In addition, the server portion of the software may operate to send messages to participating users upon the occurrence of a deficiency or other pre-defined condition.

Information about the server is sent in a single compilation, allowing the monitoring user computer to avoid having to send repeated queries to the server to gather necessary information from the server. Servers that are not connected to the network, i.e., are without power or are not running network connectivity software properly, can be detected. Subsequent to a discovery of a deficiency on the server, the display provided to the user will change to indicate the occurrence of a deficiency. The user computer portion of the software can monitor multiple servers. The selection of the server's services to be monitored by the monitoring software is determined by the server portion of the monitoring software; thus, changing the selection of the services to be monitored on a server requires no change to the user computer portion of the monitoring software.

In one aspect, the herein described methods provide a method of monitoring a server computer, the method including compiling at the server computer a collection of information about the status of the server computer, the collection including a plurality of status indicators, sending a query to the server computer from a user computer, and sending a reply from the server computer to the user computer, the reply including the collection.

The collection may include information about a deficiency at the server or other servers in the computing environment. The reply may include information directed to be included in the reply by a configuration setting at the server. A participating user computer may send a query to each of a plurality of servers and may receive a reply from each of the plurality of servers.

In another aspect, herein described methods provide a method of monitoring a server computer, the method including sending a plurality of queries for information about the server computer, the queries being sent at an adjustable frequency, each query being sent to the server computer from a user computer, compiling the information in a reply to one of the queries, sending the reply from the server computer to the user computer and, based on the reply, adjusting the display of information to participating users.

Implementations of this aspect may include one or more of the following features. The reply may include information about a deficiency at the server computer and the frequency may be increased as a result of the deficiency. The reply may include the status of a software service at the server computer or information directed to be included in the reply by a configuration setting at the server computer.

The method may further include using a plurality of lists of server computers, wherein each list corresponds to a different frequency of sending queries. The method may further include determining from the reply whether a deficiency exists at the server computer and depending on the outcome of that determination, moving a list entry for the server computer, the list entry being moved from one of the lists of server computers to another of the lists of server computers. Moving the list entry may further depend on a configuration setting.

A. Exemplary Computing Environment

Figure 1:
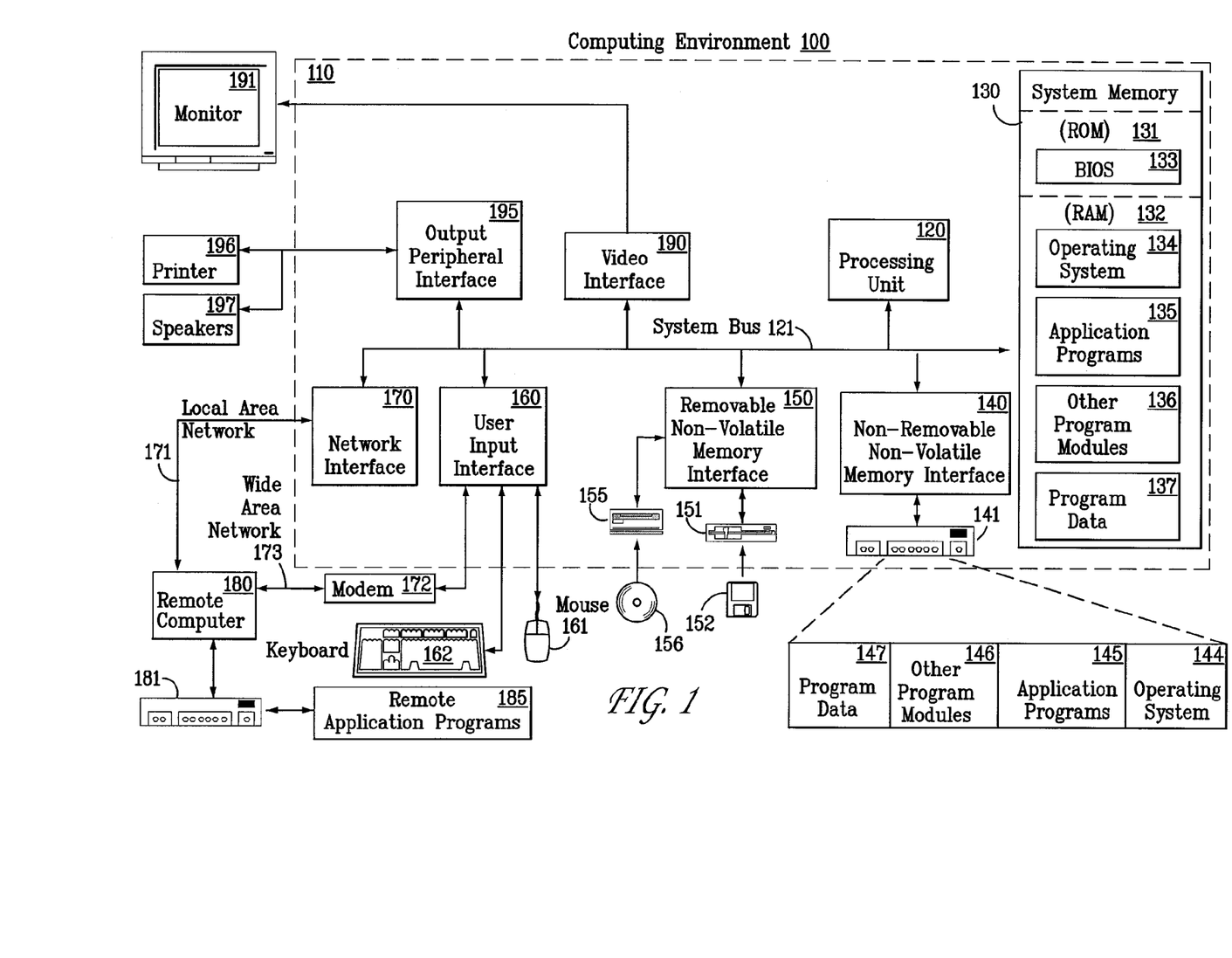
FIGS. 1 and 2 are schematic illustrations of exemplary computing environments suitable for the present invention, with FIG. 2 depicting an exemplary networked computing environment.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

B. Exemplary Networked Computing Environment

Figure 2:
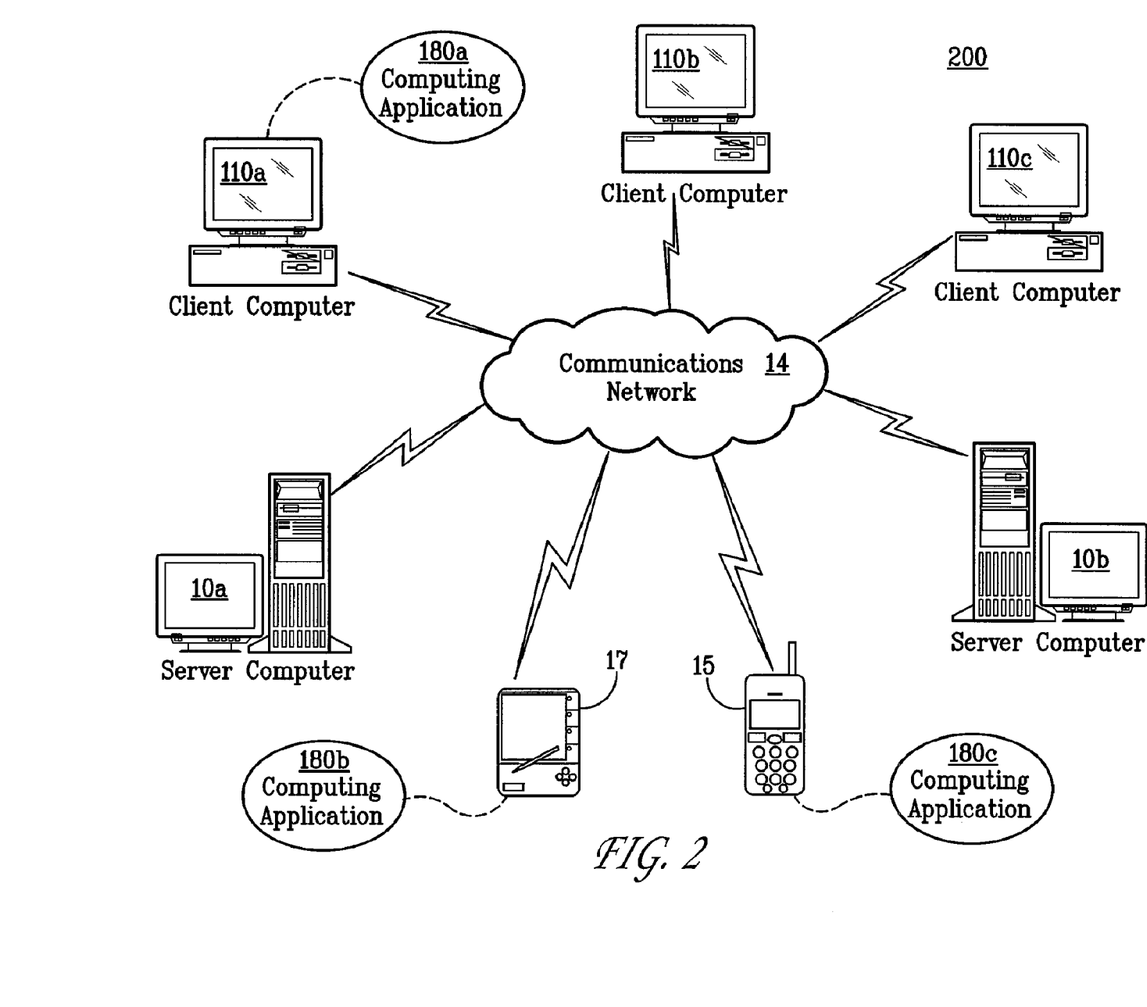

Computer environment 100, described above, can be deployed as part of a computer network. In general, the above description for computers applies to both server computers and client computers deployed in a network environment. FIG. 2 illustrates an exemplary network environment, with a server in communication with client computers via a network, in which the present invention may be employed. As shown in FIG. 2, a number of servers 10a, 10b, are interconnected via a communications network 14 (which may be a LAN, WAN, intranet, the Internet, or other computer network) with a number of client computers 110*a*, 110*b*, 110*c*, or computing devices, such as, mobile phone 15, land-line telephone 16, and personal digital assistant 17. In a network environment in which the communications network 160 is the Internet, for example, the servers 10*a*, 10*b* can be Web servers with which the clients 110*a*, 110*b*, 110*c* communicate via any of a number of known protocols, such as, hypertext transfer protocol (HTTP) or wireless application protocol (WAP). Each client computer 110*a*, 110*b*, 110*c* can be equipped with browser 180*a* to gain access to the servers 10*a*, 10*b*. Similarly, personal digital assistant 17 can be equipped with browser 180*b* and mobile phone 15 can be equipped with browser 180*c* to display and receive various data.

In operation, a user (not shown) may interact with a computing application running on a client computing devices to monitor through the use of micro-monitor cooperating database environments. The reports may be stored on server computers and communicated to cooperating users through client computing devices over communications network 14. A user may monitor and manage data environments by interfacing with computing applications on client computing devices. The operations surrounding monitoring may be communicated by client computing devices to server computers for processing and storage. Server computers may host computing applications to facilitate the monitoring of data environments.

Thus, the present invention can be utilized in a computer network environment having client computing devices for accessing and interacting with the network and a server computer for interacting with client computers. However, the systems and methods described herein can be implemented with a variety of network-based architectures, and thus should not be limited to the example shown. The herein described systems and methods will now be described in more detail with reference to a presently illustrative implementation.

C. Micro-Monitors

In an illustrative implementation, micro-monitoring extends the monitoring and administrating user experience by providing users a way to monitor server activity without having to maintain a full view of the monitoring application. In operation, micro-monitoring can be activated multiple ways in the standard monitoring UI. Either clicking from a menu, or clicking an icon in the toolbar will replace the full monitoring view with the micro-monitor. The micro-monitor provides high level bits of information: among others are the status of the user's publishers and subscriptions, the sum of errors and warnings, brief messages displaying the most recent activity and a time stamp of when that activity occurred. The user can position this small window anywhere on the screen that is convenient.

As a result the user has additional computing operating display space for other separate activities while allowing a high level, dynamic view of the monitor to remain visible. When an error or warning occurs, the micro-monitor provides a visual and audio alert. The user has the option to expand the micro-monitor and return it to the full view or opt to leave it in the current state. Just like the standard full view, the micro-monitor will continue to function and monitor other activities. It will constantly maintain visual indicators to show that an error/warning has occurred and will reflect that state until the issue has been resolved. The user will also be able to gather limited information about the problem being reported without returning the window to the full size. In addition, the micro-monitor provides controls to control operations of the computing environments it is monitoring.

In this context, the user is afforded a small formed-factor monitoring application which provides the benefits of full blown fully expanded monitoring computing applications. Such form factor is more easily used by administrators as the micro-monitor may be positioned as part of the display area of the administrator's monitoring computing environment. Additionally, as the contemplated micro-monitor is capable of displaying graphics and sounds, participating database administrators may choose to operate micro-monitor in conjunction with other computing applications and would be notified of errors immediately through the described graphics and/or sounds.

In the contemplated implementation, in the instance the micro-monitor is restored to the complete view, it may present a summary page that highlights the errors and warnings. Using the summary page, user is allowed to dig deeper into the application to gather more detailed information about the error or warning and/or to correct the defect.

Figure 3:
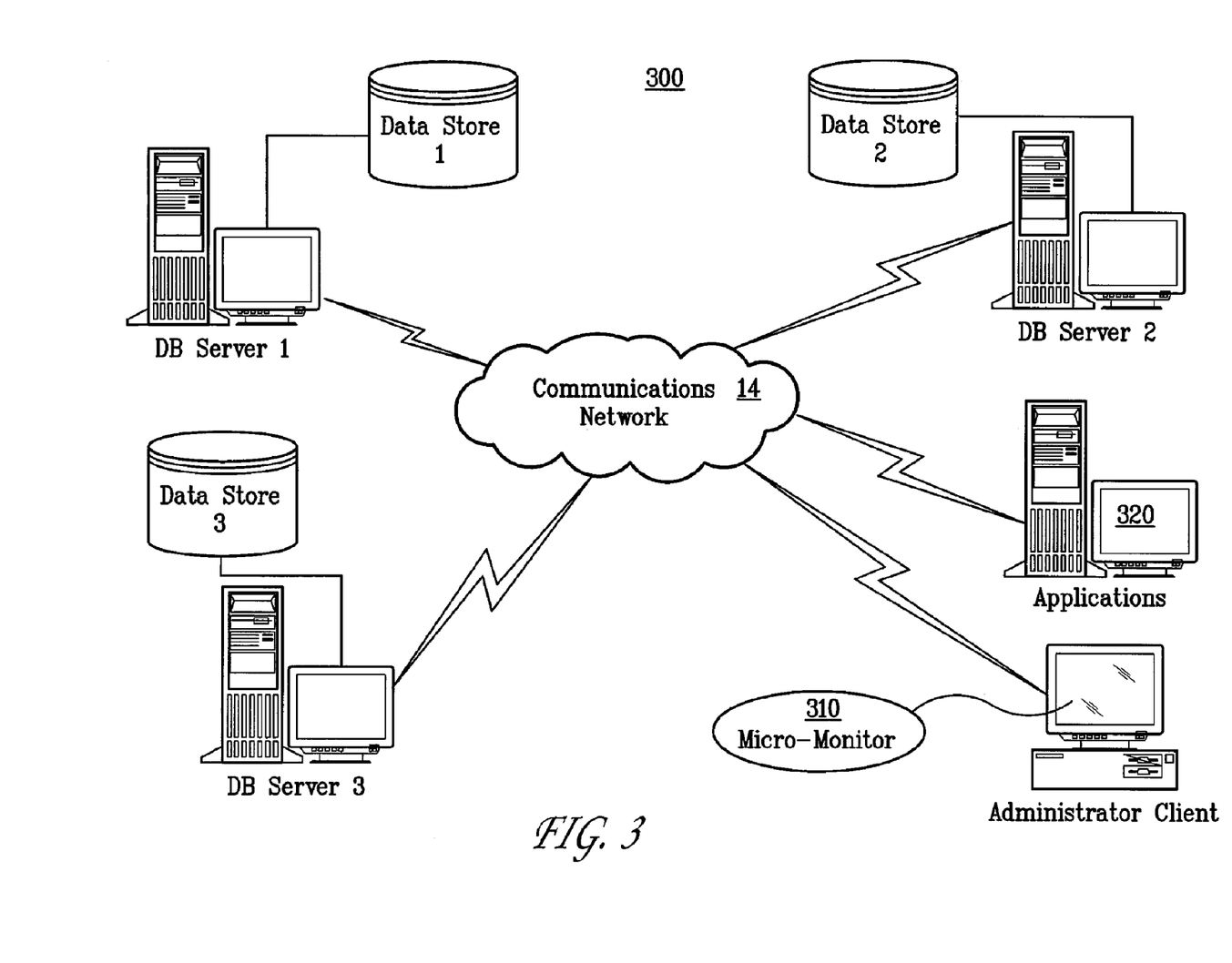
FIG. 3 is a block diagram of a micro-monitor system and the cooperation between its components.

FIG. 3 shows a system diagram of an exemplary database environment operating a micro-monitor in accordance with the herein described systems and methods. As shown exemplary database environment 300 comprises DB Server 1 maintaining Data Store 1, DB Server2 maintaining Data Store 2, and DB Server 3 maintaining Data Store 3 communications network 14, Applications, and Administrator Client executing micro-monitor computing application 310. In operation, data for use by Applications 320 is communicated among any of DB Servers 1, 2, or 3 across communications network 14 to Applications 320. It is appreciated that Applications 320 may operate on a various computing environments as indicated by the Applications residing computer server figure having a dashed outline.

Micro-monitor application 310 operating on Administrator Client communicates with DB Servers 1, 2, and 3 over communications network 14 to obtain monitoring database operational information for processing to generate monitoring information. DB Servers 1, 2, and 3, maintaining Data Store 1, 2, and 3 together form a single database being housed over four distinct computing environments. In this context, micro-monitor 310 operates to monitor the resulting distributed database (or in an alternative contemplated implementation, a replicated database) comprised of Data Stores 1, 2, and 3. In addition to communicating with Data Stores 1, 2, and 3, micro-monitor application 310 cooperates with the any underlying computing environment operating environment operating on DB Servers 1, 2, and 3 on which Data Stores 1, 2, and 3 operate.

It is appreciated that although micro-monitor system 300 is described in a particular configuration having a particular configuration of computing environments, database servers, data stores, and communications networks, that such description is merely exemplary as the inventive concepts described herein extend to various computing environments having various databases and their associated components arranged in various configurations and operating differently from the provided description.

Figure 4:
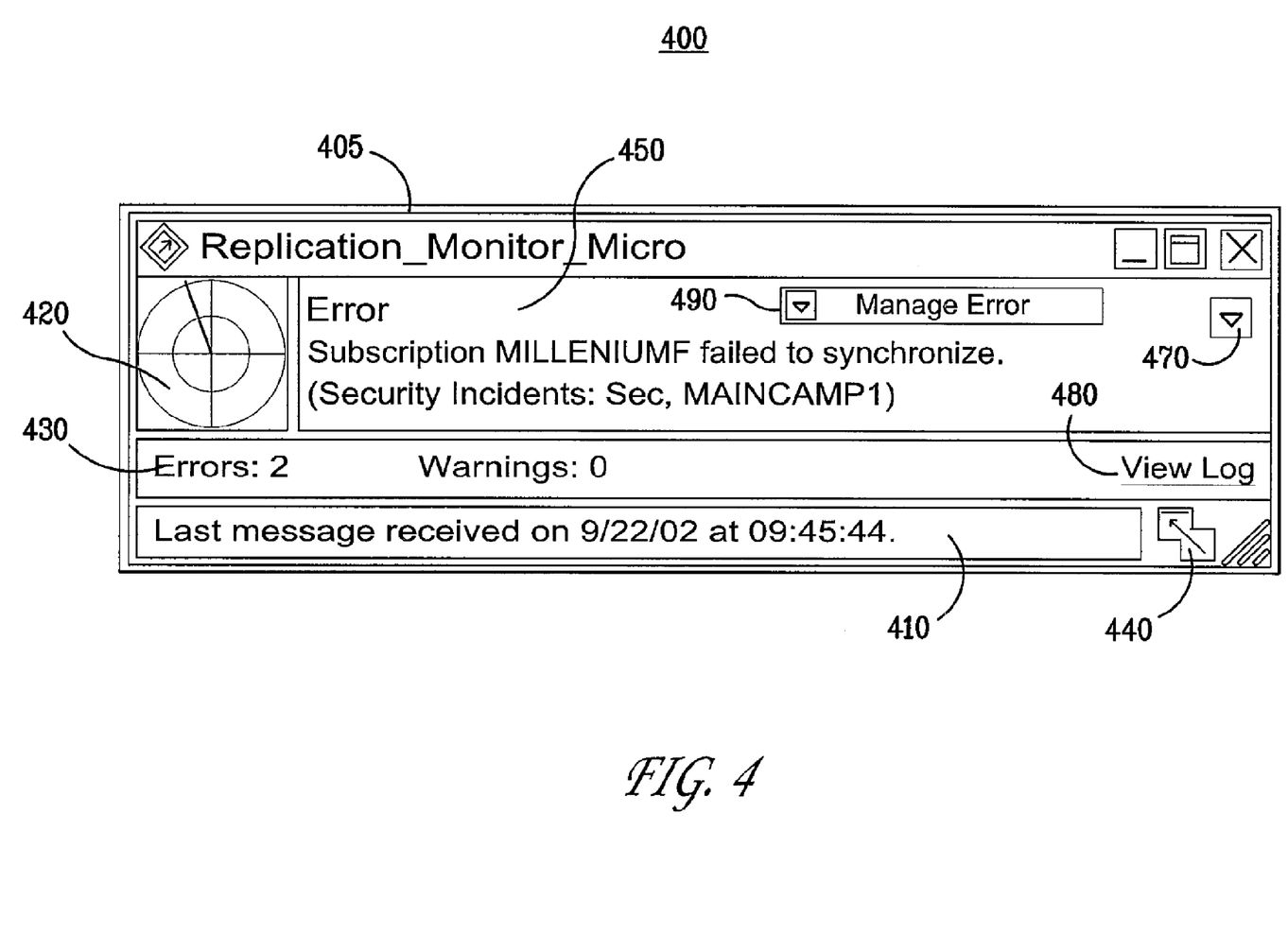
FIG. 4 is a screen shot of an exemplary micro-monitor.
Figure 5:
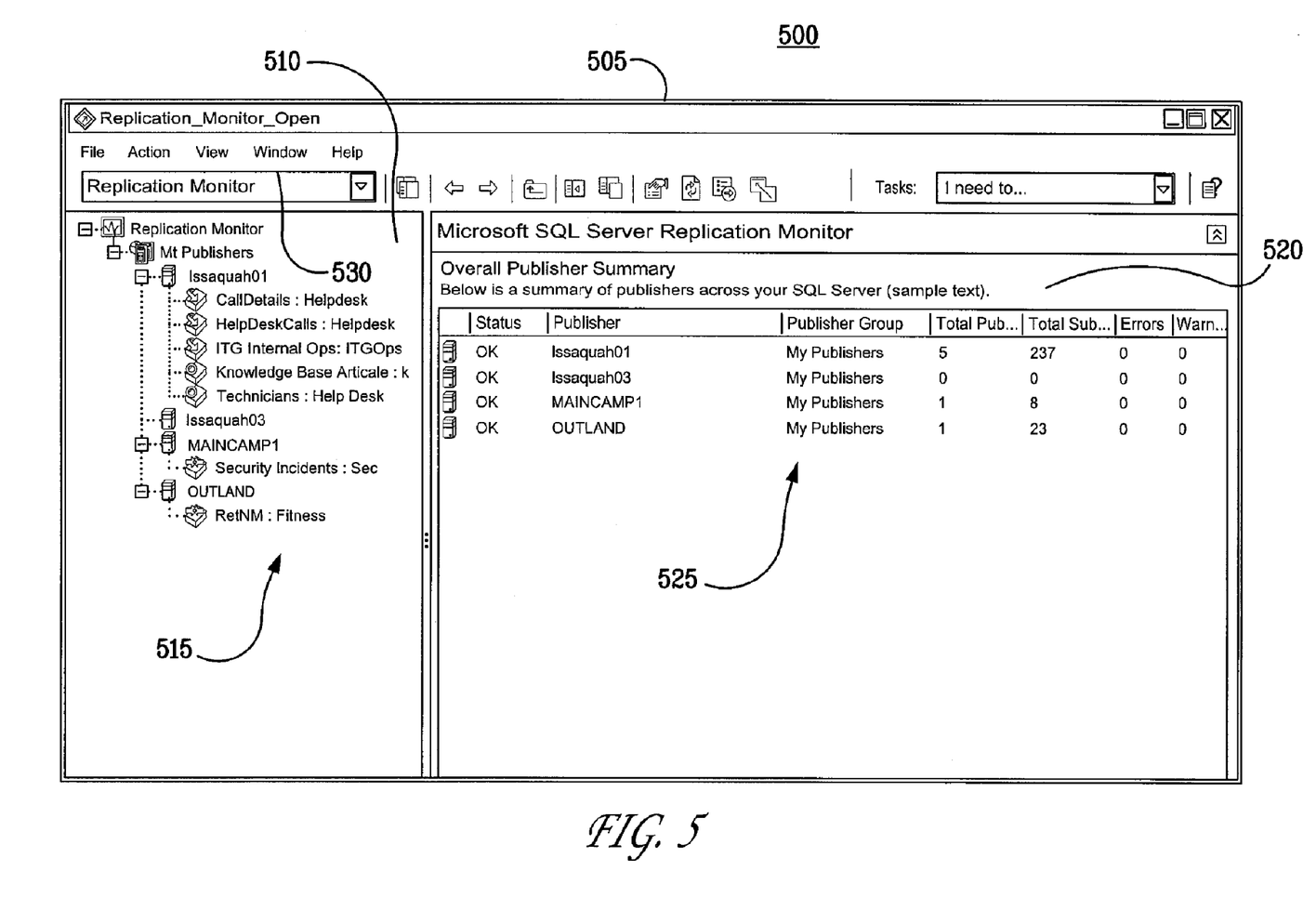
FIG. 5 is a screen shot of an exemplary monitor on which the micro-monitor is based.

FIG. 4 is a enlarged screen shot of exemplary micro-monitor 400 when executed. As is seen in FIG. 4, micro-monitor 400 comprises graphical user interface 405 having display areas 410, 420, 430, 450 and controls 440, 470, 480, and 490. In operation, graphical user interface 405 accepts commands and inputs from participating users (not shown) through controls 440 and 470. In an illustrative implementation, control 440 when engaged works to indicate to exemplary micro-monitor 400 to expand graphical user interface 405 to conventional application size. In this occurrence, all of the information presently displayed on graphical user interface 405 will be displayed in the expanded, restored conventional computing application graphical user interface (as shown in FIG. 5). Controls 470 and 480, when engaged operate to provide additional monitoring information than displayed in display areas 410, 420, 430, and 450. In the provided exemplary implementation provided, control 470, when engaged scrolls through the list of operational conditions for the monitored database environments (e.g. scrolls through an error list). Comparatively, control 480, when engaged, provides an expanded view transaction log (s) for the database environments being monitored. The expanded view may comprise higher priority activity that the micro monitor has been collecting. Control 490 is a dialog box which avails participating users to control and manage monitored errors. In this context when control 490 is engaged, micro-monitor 400 cooperates with the database environments (not shown) and the computing environments operating systems on which the database environments operate to navigate the source of the error such that the error may be resolved. Alternatively, control 490 may serve as command line which sends commands from micro-monitor 490 to the database environments which are being monitored such that a displayed error may be resolved directly from micro-monitor 400.

Display areas 410, 420, 430 and 450 may be configured to display a plethora of monitoring information. In the provided exemplary illustrative implementation, display area 410 is configured to display the information about the date and time of the last message received from the database environments being monitored. Display area 430, is configured to display the number of errors and warnings encountered during monitoring. Display area 420 is configured to provide a graphical display which indicates by color (not shown), and through the display of various graphics the operational state of the monitored database environments. In this context, if an error is encountered by the monitored database environment, display area may display a red graphic showing the number of the database server and/or data store on which the error occurs. Display area 450, shown as the largest, provides operational information about the database environments being observed. In the provided exemplary illustrative implementation, display area 450 is used to display error-type information about a cooperating database environment (not shown) being observed.

It is appreciated that although micro-monitor 400 is described as having a particularly configured graphical user interface with specific display areas and controls, that such description is merely exemplary as the inventive concepts described herein extend various graphical user interfaces configured in a variety of ways and comprising the same, additional or fewer described components.

Figure 4A:
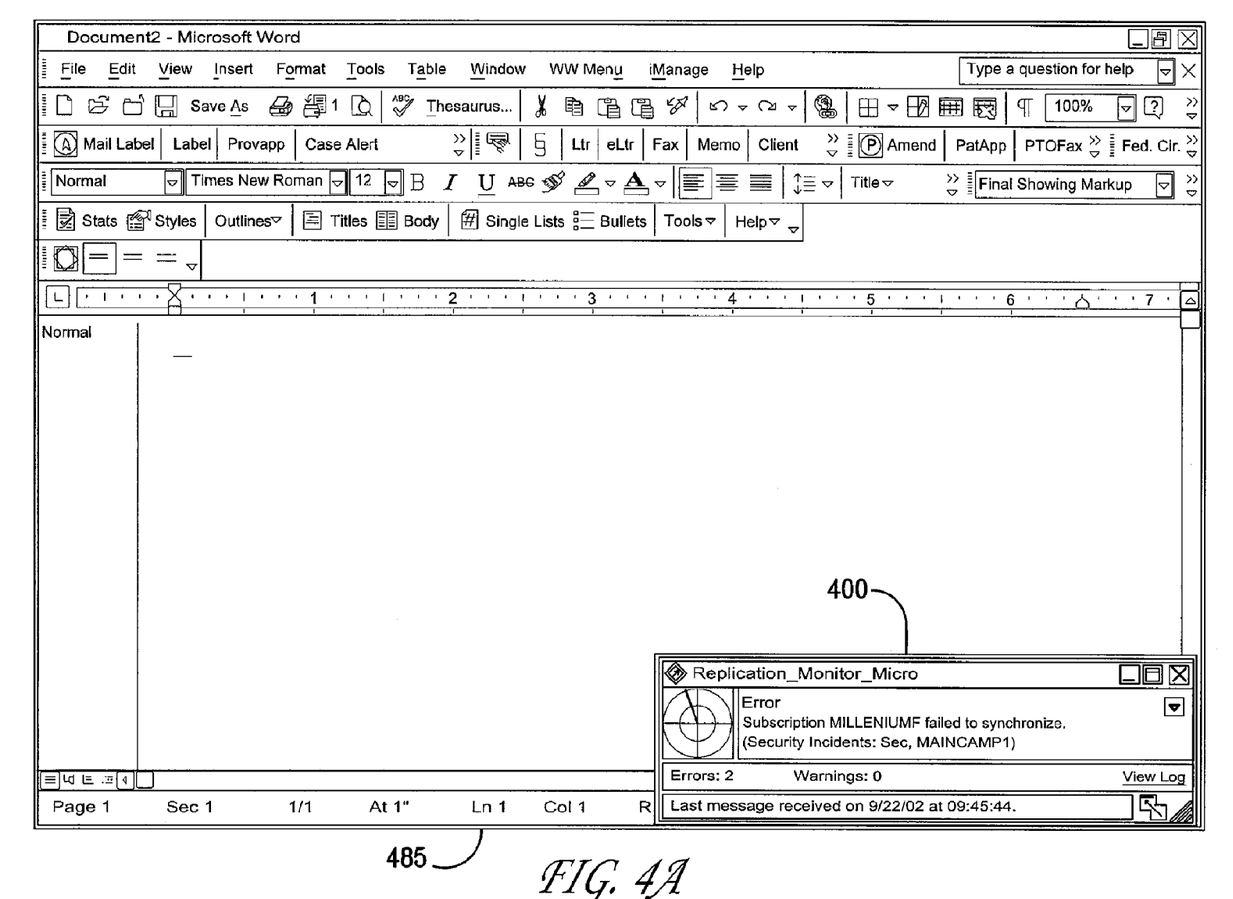

FIG. 4A is a screen shot of a conventional computing environment display area wherein a micro-monitor is being executed. As is shown in FIG. 4A, conventional computing environment display area 485 comprises, for exemplary purposes, a word processing application. Micro-monitor 400 in full execution mode comprises but a fraction of the total available display area provided by a convention computing environment display area 485. The small form factor of micro-monitor 400 allows participating users (not shown) to operate other computing applications whilst performing the all important task of monitoring.

FIG. 5 is a screen shot of an exemplary monitoring application 500. As described in FIG. 4, micro-monitor 400 (not shown) may operate to expand into a conventional sized monitoring application 500. As is shown in FIG. 5, monitoring application 500 comprises graphical user interface 505 having display areas 510, 520, controls 530, and content 515 and 525. In the provided exemplary illustrative implementation, display area 520 comprises control content 515 which allows participating users (not shown) the ability to navigate through cooperating database environments (not shown). In operation, when micro-monitor 400 (not shown) is expanded into conventional sized monitoring application 500, the data populated in micro-monitor 400 (not shown) is populated in monitoring application 500 in display areas 510 and 520. The mapping of the content may be pre-configured such that content found in display area 430 (not shown) of micro-monitor 400 (not shown) may map to the content 525 of display area 520. Similarly, content found in display area 450 (not shown) may also map to content 525 of display area 520. Likewise controls 490 (not shown) may map to control content 515 of display area 510. Controls 530 may be employed to navigate and manage content 515 and 525 of display areas 510, and 520, respectively.

Figure 6:
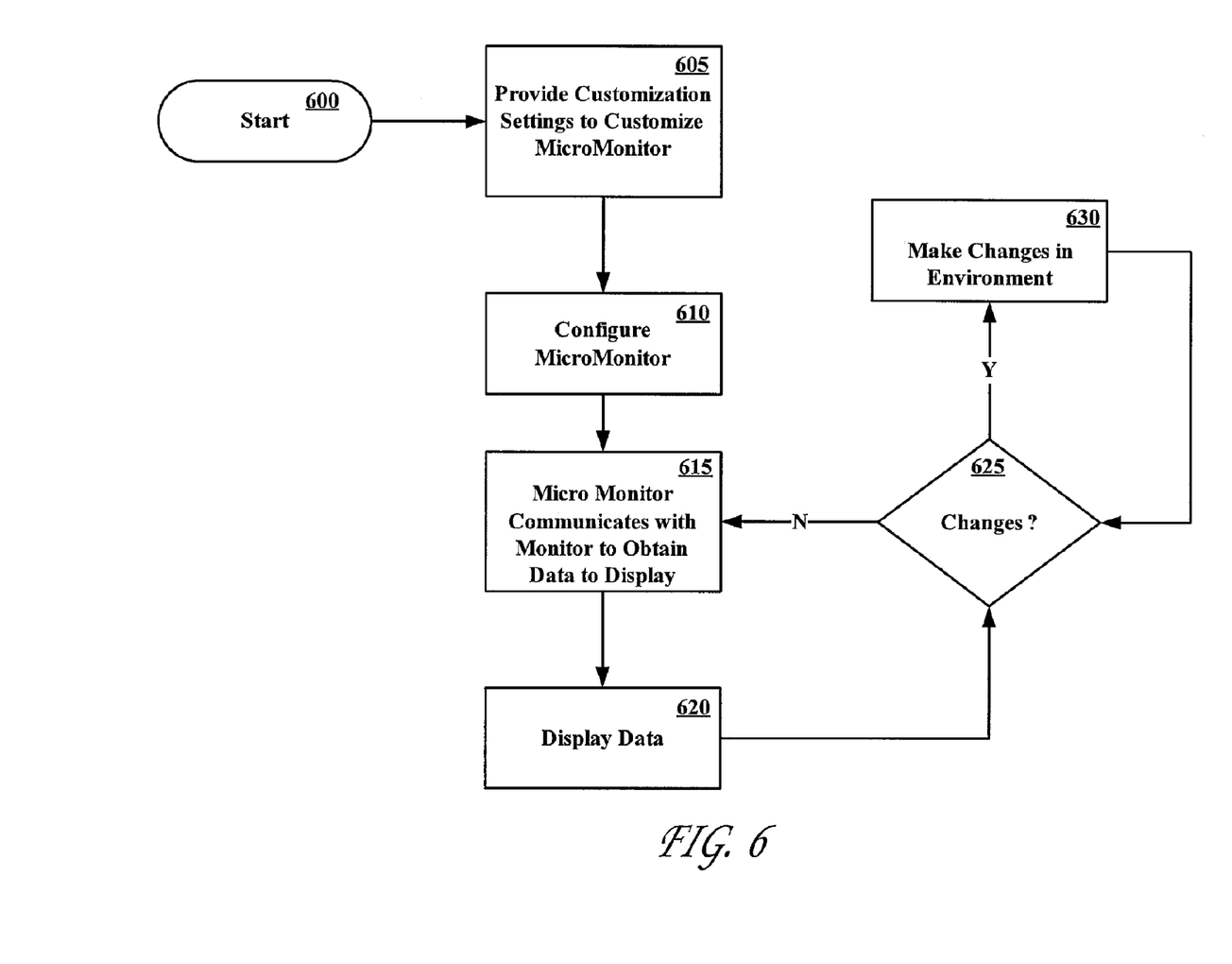
FIG. 6 is a flowchart diagram of the processing performed by the micro-monitor to perform monitoring functions.

FIG. 6 is a flow diagram of the processing performed when executing, configuring, and operating an exemplary micro-monitor. As shown, processing begins at block 600 and proceeds to block 605 where the customization settings for the micro-monitor are provided. Customization/configuration settings may comprise the location of micro-monitor display areas, and controls. Processing then proceeds to block 610 where the micro-monitor is configured according to the provided configuration settings. The micro-monitor then communicates with the cooperating database environments at block 615 to obtain the data required for monitoring. A check is then performed to determine if the changes to the database environment were received by the micro-monitor. If at block 625, it is determined that changes have been made, processing proceeds to block 630 where the received changes are made. If, however, at block 625 it is determined that there are no changes, processing reverts to block 615 and proceeds there from to display data 620.

D. Conclusion

The herein described systems and methods provide a micro-monitor for use to monitor database environments. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer environments (including both non-wireless and wireless computer environments), partial computing environments, and real world environments. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

What is claimed:

1. A method to monitor a first database for an error and to monitor using less than a full computer display, the method comprising:
   providing a monitoring application in communication with the first database, the monitoring application having a graphical user interface comprising a full view and a micro-monitor view, where the micro-monitor view is smaller than the full view and the micro-monitor view displays a description of the error, a time and date for the error, and a number representing the first database;
   providing a configuration mechanism to select the mapping of content between the full view and the micro-monitor view;
   providing a control within the micro-monitor view for scrolling through a list of errors; and
   providing a communication mechanism, the communication mechanism used by the monitoring application to communicate with the first database.

2. The method as recited in claim 1, further comprising providing size adjustment controls for the micro-monitor view, wherein the controls perform the task of expanding the size of the micro-monitor view.

3. The method as recited in claim 1, further comprising providing command line controls for the micro-monitor view, wherein the command line controls allow the monitoring application to control one or more operations of the first database.

4. The method as recited in claim 3, further comprising providing navigation controls for the micro-monitor view that allow users to obtain detailed monitoring information.

5. The method as recited in claim 1, further comprising providing graphic alerts through micro-monitor view representative of the operational state of the first database.

6. The method as recited in claim 4, further comprising providing sound alerts through micro-monitor view representative of the operational state of the first database.

7. A computer readable medium having computer readable instructions to instruct a computer to perform the method as recited in claim 1.

8. A system to monitor a first database for an error and to monitor using less than a full computer display computing environment comprising:
   a micro-monitor occupying less than a full computer display, the micro-monitor comprising a first display area containing first content, the first content comprising a description of the error, a time and date for the error, and a number representing the first database;
   a control within the micro-monitor for scrolling through a list of errors;
   a monitoring application, larger than the micro-monitor, where the micro-monitor operates to expand into the monitoring application, the monitoring application comprising a second display area containing second content, where first content maps to the second content;
   a communications mechanism, the communications mechanism used by the micro-monitor to communicate data to and from the first database.

9. The system as recited in claim 8, wherein the micro-monitor comprises a plurality of display areas for use to display monitoring information.

10. The system as recited in claim 9, wherein the micro-monitor comprises command controls allowing the micro-monitor to perform at least one operation on the first database.

11. The system as recited in claim 8, wherein the micro-monitor generates graphical and aural notices representative of at least one error occurring in the first database.

* * * * *